US007009019B2

(12) United States Patent
Mihan et al.

(10) Patent No.: US 7,009,019 B2
(45) Date of Patent: Mar. 7, 2006

(54) PLASTIC HOLLOW BODY MADE OF HIGH DENSITY POLYOLEFINS PRODUCED BY MEANS OF A FLUORO MODIFIED CHROME CATALYST

(75) Inventors: Shahram Mihan, Ludwigshafen (DE); Wolfgang Rohde, Speyer (DE); Ilka Beuermann, Pulheim-Sinthern (DE); Bernhard Springholz, Worms (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 10/332,581

(22) PCT Filed: Jun. 28, 2001

(86) PCT No.: PCT/EP01/07409

§ 371 (c)(1),
(2), (4) Date: May 9, 2003

(87) PCT Pub. No.: WO02/06073

PCT Pub. Date: Jan. 24, 2002

(65) Prior Publication Data

US 2003/0171524 A1    Sep. 11, 2003

(30) Foreign Application Priority Data

Jul. 13, 2000    (DE) ............... 100 34 191

(51) Int. Cl.
C08F 210/02    (2006.01)
C08F 4/26    (2006.01)
B29D 22/00    (2006.01)
B29D 23/00    (2006.01)
B65D 1/26    (2006.01)

(52) U.S. Cl. .............. 526/348.6; 526/98; 526/106; 526/352; 502/224; 502/237; 428/35.7; 428/36.7; 428/500; 428/516

(58) Field of Classification Search ............... 428/366, 428/35.7, 36.7, 500, 516; 526/98, 106, 348.6, 526/352; 502/224, 237
See application file for complete search history.

(56) References Cited

U.S. PATENT DOCUMENTS

| 3,130,188 A | 4/1964 | Hogan et al. |
| 4,596,862 A | 6/1986 | McDaniel et al. |
| 5,480,852 A | 1/1996 | Mueller et al. |
| 5,557,021 A | 9/1996 | Mueller et al. |
| 5,589,241 A * | 12/1996 | Stiles et al. ............... 428/36.9 |
| 6,180,731 B1 | 1/2001 | Rohde et al. |

FOREIGN PATENT DOCUMENTS

| DE | 25 40 279 | 3/1977 |
| EP | 555 741 | 8/1993 |
| EP | 626 256 | 11/1994 |
| EP | 645 400 | 3/1995 |
| EP | 849 293 | 6/1998 |
| GB | 1550951 | 8/1979 |
| WO | 97/08213 | 3/1997 |

* cited by examiner

Primary Examiner—Caixia Lu
(74) Attorney, Agent, or Firm—Novak Druce & Quigg LLP

(57) ABSTRACT

A hollow plastic article is described, with at least one opening and with a structure which has one or more layers, the hollow plastic article comprising at least one layer made from a polyolefin which was prepared using a fluorine-modified chromium catalyst. The use of hollow plastic articles of the invention as plastic fuel containers, gasoline canisters, plastic tanks, or plastic bottles or the like is also described.

19 Claims, No Drawings

PLASTIC HOLLOW BODY MADE OF HIGH DENSITY POLYOLEFINS PRODUCED BY MEANS OF A FLUORO MODIFIED CHROME CATALYST

The present invention relates to hollow plastic articles produced using specific polyolefin materials and having a structure of one or more layers and having improved component strength.

The present invention further relates to the use of hollow plastic articles of this type with improved component strength as fuel tanks in automotive construction.

Hollow plastic articles used for storing or transport of hazardous liquid materials have been known for a long time. Particularly in vehicle construction, hollow plastic articles used as fuel tanks have almost completely displaced the previous conventional tanks made from metallic materials. Plastics are moreover now almost the only material used to produce portable containers of all types, such as fuel canisters and plastic bottles for combustible liquids, hazardous substances, and the like. The particular advantage of plastic containers and tanks is especially their low weight/volume ratio, the avoidance of corrosion problems, and also, in particular for vehicle construction, better crash properties.

Hollow plastic articles are in many cases blowmolded from polyolefins, mostly from high-density polyethylene (HDPE). The disadvantage of polyethylene vessels of this type is primarily their low level of barrier action with regard to the permeation of their contents. For automobiles there are strict legal requirements for the avoidance of ozone-forming emissions, e.g. fuels. The low level of barrier action of polyolefins with respect to the permeation of volatile substances therefore means that additional measures generally have to be taken to reduce permeation, the most important of these being the fluorination of the container surface or the introduction of a barrier layer made from polar barrier plastic. Barrier layers of this type are mostly introduced into the container wall in the prior art by what is known as multilayer coextrusion blowmolding.

Barrier layers in turn mostly bring about lower mechanical strength in coextrusion-blowmolded containers. Containers comprising a barrier layer are in particular more susceptible than uncoated high-density polyethylene containers to impact at low temperatures.

There are particular problems which arise especially in the construction of plastic fuel tanks from polyethylene. Plastic fuel tanks are classed as components with safety implications in automotive construction and are therefore subject to particularly high requirements in relation to component strength, crash properties and fire resistance. In the construction of plastic fuel tanks there is therefore a particular need to comply with the specific requirements placed upon components in this class.

European patent EP 0 645 400 describes plastic fuel tanks using polyethylenes of a new type with particular properties. A substantive feature of these materials is an elongational viscosity ratio characterized by the dimensionless value R described in that specification. According to EP 0 645 400, suitable polyethylene materials achieve R values of at least 2.5. The disadvantage of these materials is that the products have to have high molar masses to achieve the required high R values. This in particular impairs processing performance, either by restricting the output or by producing high melt pressures. In addition, the materials according to EP 0 645 400 tend to develop flow anomalies which can cause thin areas in the finished part.

There is therefore a considerable need for new polyolefin materials, in particular polyethylene, which can produce hollow plastic articles with increased component strength, while their processing properties remain as good as those of the materials conventionally used nowadays for these applications.

It is known that the properties of polyolefins can be controlled and modified over a wide range via the nature and structure of the polymerization catalyst used and of the support material used. The makeup of the catalyst support and of the catalytically active material thereupon, the structure of the same, and the activation conditions have a decisive effect on the performance of the catalyst in the polymerization process, on the activity of the catalyst, and on the structure and properties of the resultant polymer. Very small changes in the makeup or structure, either of the catalytically active material or of the support material, therefore frequently lead to surprising effects.

For example, U.S. Pat. No. 3,130,188 discloses that silica-gel-supported chromium oxide catalysts modified with inorganic fluorides, such as ammonium hexafluorosilicate, have increased polymerization activity, and that the resultant polyethylene has a narrow molecular weight distribution.

It is an object of the present invention to produce hollow plastic articles using a new type of polyolefin materials which give increased component strength and avoid the abovementioned disadvantages of the prior art. A further object of the present invention is to provide hollow plastic articles with improved properties, using a new type of polyolefin materials which can be prepared without any significant change in the material processing properties from those of conventional standard materials. In particular, it is an object of the present invention to provide hollow plastic articles with increased component strength, using new polyethylene materials.

We have found that this object is achieved by means of a hollow plastic article which has at least one opening wherein the hollow plastic article, whose structure has one or more layers, has at least one layer made from a polyolefin which was prepared using a fluorine-modified chromium catalyst.

Advantageous embodiments are given by combination with the features of the dependent subclaims.

Surprisingly, it has now been found that by using fluorine-modified chromium catalysts of Phillips type it is possible to prepare polyolefins whose property profile is ideally suitable for use in hollow plastic articles. It has been found that using fluorine-modified chromium catalysts it is possible to prepare polyolefin materials which have a balanced ratio of environmental stress cracking resistance to toughness. The polymers obtained have high environmental stress cracking resistance together with high impact strength. This is particularly surprising since the relationship between these properties is usually precisely the opposite, i.e. impact strength falls when environmental stress cracking resistance increases, and vice versa. These unusual properties of polyolefins prepared by way of fluorine-modified chromium catalysts can be used particularly advantageously in producing hollow plastic articles of the invention.

Surprisingly, hollow plastic articles, in particular plastic fuel tanks, which use polyolefin materials prepared with the aid of fluorine-modified chromium catalysts have excellent component strength, due to the high environmental stress cracking resistance and the high impact strength, while at the same time the conditions for processing the material are favorable.

The use of polyolefins of the invention is particularly effective in giving mechanical properties superior to the prior art when they are used in multilayer hollow plastic articles which comprise a permeation-reducing barrier layer or coating.

The polyolefin materials used according to the invention are homo- or copolymers of ethylene and/or of propylene, the comonomers used being 1-alkenes, such as propene, butene, hexene, octene, or the like. Particular preference is given to high-density homopolymers of ethylene (HDPE), and also to high-density ethylene copolymers using butene and/or hexene as comonomers.

The polyolefin materials to be used in hollow plastic articles of the invention are prepared using a fluorine-modified chromium catalyst. To this end, known prior-art catalysts are fluorine-modified by way of suitable fluorinating agents. Conventional chromium-containing polymerization catalysts which comprise silica gel or modified silica gel as support material and chromium as catalytically active component have long been known in the prior art as Phillips catalysts in the preparation of high-density polyethylene. Phillips catalysts are generally activated at high temperatures before the polymerization in order to stabilize chromium in the form of a chromium(VI) species on the catalyst surface. This species is reduced by adding ethylene or reducing agents in order to develop the catalytically active chromium species.

Polyolefin materials, in particular polyethylene materials, which can be used for producing hollow plastic articles of the invention are produced by way of fluorine-modified heterogeneous chromium catalysts.

Particularly suitable catalysts are air-activated silica gel-supported chromium catalysts which are modified using suitable inorganic fluorinating agents. Spherical support materials based on silica hydrogels with a relatively high solids content of from 10 to 25% (calculated as $SiO_2$) are particularly suitable. These support materials are then loaded with suitable chromium compounds and activated in a stream of anhydrous oxygen at a concentration of 10% by volume, at from 400 to 1100° C.

The preparation of suitable catalysts is, for example, described in DE 25 40 279 (an English translation of the specification of DE 25 40 275 is provided subsequent to the illustrative examples), and the fluoride doping which is also needed here may, if desired, take place during the preparation of catalyst precursors (i.e. during the impregnation step) or in the activator during the activation step, for example by coimpregnation of the support with a solution of the fluorinating agent and the desired chromium compound, or by adding fluorinating agents within the gas stream during air activation.

Suitable fluorinating agents for doping supported chromium catalysts are any of the usual fluorinating agents, such as $ClF_3$, $BrF_3$, $BrF_5$, ammonium hexafluorosilicate ($NH_4SiF_6$), ammonium tetrafluoroborate ($NH_4BF_4$), ammonium hexafluoroaluminate ($NH_4AlF_6$), $NH_4HF_2$, ammonium hexafluoroplatinate ($NH_4PtF_6$), ammonium hexafluorotitanate ($NH_4TiF_6$), ammonium hexafluorozirconate ($NH_4ZrF_6$), and the like. Particular preference is given to supported chromium catalysts doped with ammonium hexafluorosilicate.

The usual polymerization processes of the prior art are used, with fluorine-modified chromium catalysts, to prepare polyolefins which can be used according to the invention, examples of these processes being suspension polymerization or else dry-phase polymerization, gas-phase polymerization with agitation, gas phase polymerization in a fluidized bed, and solution polymerization. These processes may be carried out either in single-reactor systems or else in reactor-cascade systems.

Polyolefins prepared using fluorine-modified chromium catalysts have a balanced property profile. When fluorine-doped chromium catalysts are used to prepare copolymers of propylene or of ethylene with α-olefins the polymers obtained give excellent processing and have a low flow rate. Polyethylene prepared in this way has a narrower molecular weight distribution than polyethylene prepared with undoped catalysts, but this distribution very surprisingly does not affect the processing properties of the material.

The density of polyethylene homo- or copolymers which can be used according to the invention and which have been prepared using fluorine-doped chromium catalysts is in the range from 0.930 to 0.960 g/cm$^3$, preferably from 0.945 to 0.955 g/cm$^3$, in particular from 0.947 to 0.953 g/cm$^3$.

The flow properties of materials which can be used according to the invention are characterized by a melt flow rate MFR (190° C./21.6 kg) of from 2 to 8 g per 10 minutes. Preference is given to materials with melt flow rates of from 3 to 7 g per 10 minutes, in particular from 4 to 6 g per 10 minutes.

Using these materials it is possible to produce hollow plastic articles whose structure has one or more layers and which have markedly increased component strength. This stems in particular from the high environmental stress cracking resistance of the fluorine-catalyzed polyolefins used according to the invention, and also from their high impact strength.

The structure of hollow plastic articles of the invention may have one or more layers, at least one layer being composed of a polyolefin material which was prepared by way of a fluorine-modified chromium catalyst.

According to the invention, preference is given to a multilayer structure where at least one barrier layer is present to reduce permeation of volatile substances and is composed of a polar barrier polymer. The multilayer structure, for example of a plastic fuel tank wall, has the particular advantage that the permeation-reducing barrier layer, the material properties of which lead to poorer processing conditions and/or poorer mechanical properties in the finished component, can be embedded between two polyolefin layers which have been prepared by way of fluorine-modified catalysts. Consequently, in particular during coextrusion blowmolding, the processing properties of a material of this type having more than one layer are primarily affected by the favorable properties of the polyolefin. In addition, the properties of the polyolefin material are decisive in determining the mechanical properties of the desired component, and it is therefore possible to obtain hollow plastic articles of the invention with markedly increased component strength.

However, it is also possible to use processes such as fluorination, surface coating or plasma polymerization to coat the surface of the HDPE with the base layer.

In one embodiment of the invention the hollow plastic articles have a permeation-reducing coating.

Particularly preferred embodiments of hollow plastic articles of the invention provide a six-layer structure which comprises the following layers, from the inside to the outside: polyolefin (of the invention), adhesion promoter, barrier layer, adhesion promoter, regrind, polyolefin (of the invention).

It is particularly preferable to use high-density polyethylenes (HDPES) prepared by way of fluorine-modified chromium catalysts.

The thicknesses of the layers, in the same sequence and in each case based on the total thickness of the container wall, are: polyolefin (or HDPE) 10–40%, adhesion promoter 1–5%, barrier polymer 1–10%, adhesion promoter 1–5%, regrind layer 10–82%, polyolefin (or HDPE) 5–30%.

Examples of barrier polymers which may be used according to the invention are ethylene-vinyl alcohol copolymers, polyvinyl alcohol, polyester, polyamide, fluoropolymers (e.g. PTFE, PVDF), and the like. Particularly preferred barrier polymers are ethylene-vinyl alcohol copolymers, e.g. the commercially available grades EVAL® (Kuraray) and Soarnol® (Elf Atochem), and also polyamides, e.g. Ultramid® (BASF).

Adhesion promoters which may be used according to the invention are those materials which are suitable for ensuring that the barrier polymer is compatible with, or forms a bond to, the polyolefin. Preferred adhesion promoters are based on block copolymers of maleic anhydride with HDPE, LDPE, or LLDPE, for example the polymer marketed by Mitsui as Admer® GTSE.

The material of the regrind is composed of mixtures of suitable plastics which are generally produced as waste in plastics processing. The predominant proportion of the regrind is preferably HDPE together with typical barrier polymers. The regrind layer is preferably produced from what is known as flash, as polymer residues during the production of the hollow plastic articles.

The hollow plastic articles according to the invention are preferably produced by coextrusion blowmolding.

Hollow plastic articles of the invention may be used for a wide variety of applications and products. These are in particular plastic fuel tanks in automotive construction, canisters, and tanks of all types for the storage or transport of gasoline, heating oil, diesel, and the like, solvent (receiver) tanks, plastic bottles for liquids or fluid solids, transport containers on utility vehicles, for example for crop sprays for agricultural use, solvent containers, etc.

The invention will be illustrated in further detail using the examples below, which are not to be regarded as limiting. The examples in particular show that materials prepared using fluorine-modified chromium catalysts can be used to produce hollow plastic articles with particularly good mechanical properties. The data required to describe the products were determined as stated to ISO standards.

Processing performance is described on a blowmolding machine firstly via the melt pressure in the extruder for the PE interior layer and secondly via the base gap width of the die. The base gap is that needed to achieve the required tube thickness: the smaller the base gap, the greater the swelling of the material under the conditions of processing.

Plastic fuel tanks of the invention were produced for use as a tank in automotive construction. The tanks were tested for impact resistance using a drop test. To this end, a glycol-water mixture as placed in 8 tanks of each tank type followed by cooling to 40° C. The tanks are dropped 6 m from 4 different positions. The test was carried out twice, with 2 tanks, for each drop position. For evaluation, the number of drops which did not result in fracture is calculated as a ratio of the maximum number of drops (in this case 8) and given as a percentage.

The environmental stress cracking resistance of the tanks was tested by placing a wetting agent (in this case 5% of Nekanil W in water) in the tanks, followed by storage at a pressure of 0.3 bar for 80 hours at 50° C. The test is passed if no leaks arise during this period.

The fire test was carried out to ECE R34 in the actual bodywork of a car. In addition to the ECE test itself, which requires direct flame application for 60 seconds followed by indirect flame application for 60 seconds, further experiments increased the period of direct flame application in steps of 6 seconds. The values given below have been obtained by dividing the fire-test times over which the tank remained leak-free by the wall thickness measured prior to the fire test in the region affected.

EXAMPLE 1

An ethylene-hexene copolymer was prepared using a fluorine-modified silica gel-supported chromium catalyst prepared by a method based on DE 25 40 279, the fluorine modification being carried out by coimpregnating the support material with chromium compound and ammonium hexafluorosilicate, followed by air-activation of the catalyst at 610° C. in a fluidized-bed activator. The polymerization takes place in a 30 $m^3$ Phillips loop reactor. Melt flow rate and density were adjusted via the reactor temperature and the concentration of hexene and ethylene in the suspension medium (isobutane). The reactor pressure was 39 bar. The polymerization data can be found in Table 1.

The polyethylene copolymer prepared in this way was processed on a Krupp Kautex KBS 2 coextrusion blowmolding plant to give plastic fuel tanks with a six-layer structure. The following sequence of layers was selected, from the inside to the outside (layers in percentage based on the total thickness of the tank wall):

| | |
|---|---|
| Polyethylene (of the invention) | 33% |
| Adhesion promoter (Mitsui Admer ® GT5E): | 2% |
| Barrier layer (Kuraray EVAL ® F 101): | 3% |
| Adhesion promoter (Mitsui Admer ® GT5E): | 2% |
| Regrind: | 45% |
| Polyethylene (of the invention) | 15% |

The empty weight of the tanks is 6.5 kg.

EXAMPLE 2 (COMPARATIVE EXAMPLE)

Plastic fuel tanks were produced under conditions based on those of Example 1. The catalyst used comprised a catalyst prepared as in DE 25 40 279, without fluorine modification. The catalyst was activated at 600° C. by air in a fluidized-bed activator. The polymerization was carried out as in Example 1. The polymerization data can be found in Table 1.

The product prepared in this way was processed as described above to give coextrusion-blowmolded tanks with an empty weight of 6.5 kg.

EXAMPLE 3 (COMPARATIVE EXAMPLE)

In this example commercially available polyethylene (Lupolen® 4261 AG from BASF) was used to produce the coextrusion-blowmolded plastic fuel tanks. The production and layer structure of the tanks was as given in Example 1.

TABLE 1

Polymerization data and polymer properties

|  | Unit | Example 1 | Example 2 (comparative example) | Example 3 (comparative example) |
|---|---|---|---|---|
| Reactor temp. | °C. | 103.5 | 104.5 | 103.2 |
| Ethene concentration | % by volume | 12.5 | 9.0 | 10.0 |
| Hexene concentration | % by volume | 0.12 | 0.15 | 0.30 |
| Productivity | kg PE/kg cat. | 5500 | 4000 | 4800 |
| Output | kg/h | 6000 | 5500 | 5000 |
| Bulk density | g/l | 500 | 495 | 495 |
| MFR (190/21.6 kg) | g/10 mm (ISO 1133) | 4.7 | 6 | 6 |
| Density | g/cm$^3$ (ISO 1183) | 0.951 | 0.951 | 0.945 |

The processing properties, and also the properties of the finished components, are compared in Table 2.

TABLE 2

Processing properties and component properties

|  | Unit | Example 1 | Example 2 (comparative example) | Example 3 (comparative example) |
|---|---|---|---|---|
| Melt pressure (PE interior layer) | bar | 138 | 132 | 136 |
| Melt temperature (PE interior layer) | °C. | 221 | 222 | 218 |
| Base gap | % | 18 | 19 | 19 |
| Drop test (−40° C.) | % | 88 | 75 | 75 |
| ESCR |  | + | + | + |
| Fire test (ECE R 34) | sec/min | + 42.9 | + 37.5 | + 41.3 |
| R value* |  | 2.43 | 2.39 | 2.4 |

+ = passed
*R value measured as given in EP 645 400 B1

It is noticeable that in Table 2 the impact resistance given by the drop test for plastic fuel tanks of the invention is markedly higher than for the comparative examples. It is also noticeable that although the R value of the plastic fuel tank of the invention is below the value of 2.5 mentioned as a minimum by EP 645 400 it is possible to obtain components with a markedly improved property profile.

EXAMPLE

Manufacture of the Silicic Acid Xerogel

A mixing nozzle as shown in the drawing of German Laid-Open Application 2,103,243 (=U.S. patent application Ser. No. 220,142) and having the following data is used: the diameter of the cylindrical mixing chamber of plastic tubing is 14 mm, whilst the length of the mixing chamber (including the secondary mixing zone) is 350 mm. A Tangential inlet orifice of 4 mm diameter for the mineral acid is provided near the entry side of the mixing chamber, which side is closed at its end face. This orifice is followed by four further orifices, again of 4 mm diameter and having the same inlet direction, for the waterglass solution, the spacing of the orifices being 30 mm, measured in the lengthwise direction of the mixing chamber. Accordingly, the ratio of length to diameter of the primary mixing zone is about 10. For the subsequent secondary mixing zone, this ratio is about 15. A slightly kidney-shaped, pressed flat, length of tube is pushed over the outlet end of the plastic tubing, to act as a discharge nozzle.

This mixing device is charged with 325 l/hour of 33 percent strength by weight sulfuric acid at 20° C. under an operating pressure of about 2 atmospheres gauge, and with 1,100 l/hour of a waterglass solution (manufactured from technical grade waterglass, containing 27% by weight of $SiO_2$ and 8% by weight of $Na_2O$, by dilution with water), which has a specific gravity of 1.20 kg/l, is also at 20°C. and is also under a pressure of about 2 atmospheres gauge. An unstable hydrosol having a pH of from 7 to 8 is formed in the mixing chamber defined by the plastic tubing, by progressive neutralization, and this hydrosol additionally remains for about 0.1 second until completely homogenized in the secondary mixing zone, before it is sprayed, through the discharge nozzle, as a fan-shaped liquid jet into the atmosphere. Whilst travelling though the air, the jet breaks up into individual drops, which, because of the surface tension, assume a substantially spherical shape and solidify in the course of about one second, i.e. whilst still travelling though the air, to hydrogel spheres. The spheres have a smooth surface, are glass clear, contain about 17% by weight of $SiO_2$ and have the following particle size distribution:

>8 mm 10% by weight
6–8 mm 45% by weight
4–6 mm 34% by weight
>4 mm 11% by weight (The particle size distribution can be varied as desired by using different nozzles.)

At the end of their travel through the air, the hydrogel spheres are collected in a washing tower which is almost completely filled with the hydrogel spheres, and in which the spheres are washed salt-free immediately, i.e. without aging, by means of slightly ammoniacal water at about 50°C., in a continuous counter-current process.

The spheres, which have a diameter of from 2 to 6 mm, are isolated by sieving and 112 kg of the spheres are charged into an extraction vat having an inlet at the top, a perforated bottom and a swan-neck overflow which is connected to the underside of the vat and keeps the liquid in the vat at a level such that it completely covers the hydrogel spheres. Ethanol is then allowed to run in at a rate of 60 l/hour until the density of the ethanol/water mixture issuing from the overflow has fallen to 0.826 g/cm$^3$; at that stage, about 95% of the water contained in the hydrogel has been extracted.

The spheres thus obtained are dried (12 hours at 120°C. under 15 mm Hg) until there is no further loss of weight in the course of 30 minutes at 180°C. under 10 mm Hg.

The dried spheres are then milled and the xerogel particles, which have a diameter of from 40 to 300 $\mu$m, are then isolated by sieving.

Manufacture of the Catalyst 15 kg of the xerogel described above and 40 liters of a 4.1 percent strength by weight solution of chromium-III nitrate non-ahydrate in ethanol are charged into a twin-cone mixer. The ethanol is then distilled off under reduced pressure from a water-pump whilst the mixer, which is externally steam-heated at 130°C., is rotating.

The resulting product is heated for 6 hours at 900°C. in a fluidized bed through which air flows, and is then cooled again. From 150°C. downwards, nitrogen flows through the fluidized bed to remove traces of oxygen (which interfere with the polymerization).

We claim:

1. A hollow plastic article with at least one opening, wherein the hollow plastic article, whose structure has one or more layers, has at least one layer made from a polyolefin having a density of from 0.943 to 0.955 g/cm$^3$ and a melt flow rate MFR (190° C./21.6 kg) of from 2 to 8 g/10 minutes, prepared using a fluorine-modified chromium catalyst.

2. A hollow plastic article as claimed in claim 1, wherein the polyolefin comprises a homopolymer or copolymer of ethylene.

3. A hollow plastic article as claimed in claim 1, wherein the polyolefin comprises a copolymer of ethylene, in which an α-olefin having from 3 to 8 carbon atoms is used as comonomer.

4. A hollow plastic article as claimed in claim 3, wherein the comonomer comprises 1-butene or 1-hexene.

5. A hollow plastic article as claimed in claim 1, wherein the density of the polyolefin used is from 0.945 to 0.953 g/cm$^3$.

6. A hollow plastic article as claimed in claim 1, wherein the polyolefin has a melt flow rate MFR (190° C./21.6 kg) of from 3 to 7 g/10 minutes.

7. A hollow plastic article as claimed in claim 1, which has a permeation-reducing coating.

8. A hollow plastic article as claimed in claim 1, wherein the structure of the hallow article has more than one layer and comprises, from the inside to the outside, a polyolefin layer, an adhesion promoter layer, a barrier polymer layer, an adhesion promoter layer, a regrind layer, and a polyolefin layer.

9. The hollow plastic article as claimed in claim 1 in form of a plastic fuel tank for a motor vehicle.

10. The hollow plastic article as claimed in claim 1 in form of a fuel canister, a fuel tank for storage and transport of fuels, a transport container for utility vehicles, a solvent container or a plastic bottle.

11. A method of producing a hollow plastic article with at least one opening, said method comprising coextrusion blow-molding at least one layer made from polyolefin having a density of from 0.943 to 0.955 g/cm$^3$ and a melt flow rate MFR (190° C./21.6 kg) of from 2 to 8 g/10 minutes, wherein the polyolefin has been obtained using a fluorine-modified chromium catalyst.

12. The method of claim 11, for producing a plastic fuel tank for a motor vehicle.

13. The method of claim 11, for producing a fuel canister, a fuel tank for storage and transport of fuels, a transport container for utility vehicles, a solvent container or a plastic bottle.

14. The method of claim 11, wherein the fluorine-modified chromium catalyst is a supported chromium catalyst doped with ammonium hexafluorosilicate.

15. The method of claim 11, wherein the fluorine-modified chromium catalyst is prepared by fluoride doping during an impregnation step or during an activation step.

16. The method of claim 15, wherein the fluorine-modified chromium catalyst is prepared by coimpregnation of a support with a solution of fluorinating agent and a chromium compound or by adding fluorinating agent within the gas stream during air-activation.

17. The method of claim 15, wherein a fluorinating agent selected from the group consisting of ClF3, $BrF_3$, $BrF_5$, $NH_4SiF_6$, $NH_4BF_4$, $NH_4AlF_6$, $NH_4HF_2$, $NH_4PtF_6$, $NH_4TiF_6$, $NH_4ZrF_6$ is used in the fluoride doping.

18. The method of claim 11, wherein the polyolefin is a high-density polyethylene.

19. The method of claim 11, wherein the catalyst is an air-activated silica gel-supported chromium catalyst which has been modified with an inorganic fluorinating agent.

* * * * *